US008928496B2

(12) United States Patent
Stählin et al.

(10) Patent No.: US 8,928,496 B2
(45) Date of Patent: Jan. 6, 2015

(54) ROAD SAFETY COMMUNICATION SYSTEM FOR INCREASING THE ROAD SAFETY OF PEDESTRIANS

(75) Inventors: Ulrich Stählin, Eschborn (DE); Sighard Schräbler, Karben (DE); Alfred Eckert, Mainz-Hechtsheim (DE); Peter Rieth, Eltville (DE)

(73) Assignee: Continental Teves AG & Co. oHG (DE)

( * ) Notice: Subject to any disclaimer, the term of this patent is extended or adjusted under 35 U.S.C. 154(b) by 66 days.

(21) Appl. No.: 13/809,442

(22) PCT Filed: Jul. 8, 2011

(86) PCT No.: PCT/EP2011/061682
§ 371 (c)(1),
(2), (4) Date: Feb. 12, 2013

(87) PCT Pub. No.: WO2012/007399
PCT Pub. Date: Jan. 19, 2012

(65) Prior Publication Data
US 2013/0201036 A1 Aug. 8, 2013

(30) Foreign Application Priority Data
Jul. 12, 2010 (DE) .......................... 10 2010 031 254

(51) Int. Cl.
| G08G 1/095 | (2006.01) |
| G08G 1/005 | (2006.01) |
| A43B 3/00 | (2006.01) |
| G08G 1/16 | (2006.01) |
| H04W 52/02 | (2009.01) |
| H04B 1/034 | (2006.01) |

(52) U.S. Cl.
CPC ........ *G08G 1/005* (2013.01); *A43B 3/00* (2013.01); *A43B 3/0005* (2013.01); *G08G 1/161* (2013.01); *H04W 52/0229* (2013.01); *H04B 1/034* (2013.01)
USPC ................ 340/944; 340/10.1; 340/426.26

(58) Field of Classification Search
USPC .......... 340/944, 10.1, 10.5, 3.2, 572.1–572.9, 340/990, 995.1, 426.1, 426.26, 446–447
See application file for complete search history.

(56) References Cited

U.S. PATENT DOCUMENTS

| 4,331,957 A | 5/1982 | Enander et al. | |
| 8,102,316 B1 * | 1/2012 | Brucker et al. | ............... 342/458 |
| 2003/0009308 A1 * | 1/2003 | Kirtley | .......................... 702/141 |

(Continued)

FOREIGN PATENT DOCUMENTS

| DE | 2 219 446 | 10/1973 |
| DE | 299 16 238 U1 | 1/2000 |

(Continued)

OTHER PUBLICATIONS

International Search Report for PCT Application No. PCT/EP2011/061682 mailed Oct. 31, 2011.

(Continued)

*Primary Examiner* — Daniel Previl
(74) *Attorney, Agent, or Firm* — RatnerPrestia

(57) ABSTRACT

A road safety communication device for protecting pedestrians in road traffic, which includes a transponder which is integrated into a shoe, wherein the supply of electrical power to the device is activated only in selected situations.

17 Claims, 3 Drawing Sheets

(56) References Cited

U.S. PATENT DOCUMENTS

| | | |
|---|---|---|
| 2006/0097847 A1* | 5/2006 | Bervoets et al. ............. 340/10.1 |
| 2006/0217874 A1* | 9/2006 | Ueda et al. .................... 701/117 |
| 2008/0018472 A1 | 1/2008 | Dasilva et al. |
| 2010/0076692 A1 | 3/2010 | Vock et al. |
| 2011/0094127 A1* | 4/2011 | Dana, III .......................... 36/137 |

FOREIGN PATENT DOCUMENTS

| | | |
|---|---|---|
| DE | 100 41 714 A1 | 5/2002 |
| DE | 203 12 701 U1 | 10/2003 |
| DE | 103 52 952 A1 | 6/2005 |
| DE | 100 28 219 A1 | 12/2011 |
| EP | 1 531 444 A2 | 5/2005 |
| WO | WO 03/009254 A1 | 1/2003 |
| WO | WO 2004/047047 A1 | 6/2004 |

OTHER PUBLICATIONS

German Search Report for Application No. DE 10 2010 031 254.1 mailed Apr. 8, 2011.

* cited by examiner

ROAD SAFETY COMMUNICATION SYSTEM FOR INCREASING THE ROAD SAFETY OF PEDESTRIANS

CROSS REFERENCE TO RELATED APPLICATIONS

This application is the U.S. National Phase Application of PCT/EP2011/061682, filed Jul. 8, 2011, which claims priority to German Patent Application No. 10 2010 031 254.1, filed Jul. 12, 2010, the contents of such applications being incorporated by reference herein.

FIELD OF THE INVENTION

The invention relates to a road safety communication device for protecting pedestrians in road traffic, to a safety risk analysis device for use in a motor vehicle for protecting pedestrians in road traffic which communicates with a transponder, to a method for protecting pedestrians in road traffic and to a road safety communication system for protecting pedestrians in road traffic.

BACKGROUND OF THE INVENTION

While safety from accidents and the safety systems of motor vehicles are being increasingly improved, up to now there have been virtually no practical approaches to increasing the road safety of pedestrians. In fact, pedestrians are particularly at risk in the case of accidents since, unlike the occupants of a motor vehicle, they are not protected by a crush zone or further active and passive safety systems which are possibly present.

In order to avoid injury to pedestrians in road traffic, the basic approach has already been followed of reducing the frequency of accidents by a computer installed in the vehicle signaling to the driver by means of a transponder system that there are pedestrians located in the vicinity of the vehicle.

DE 299 16 238 U1, which is incorporated by reference, discloses a method for integrating a transponder into a shoe which serves to prevent the shoe being stolen from a department store.

DE 100 28 219 A1, which is incorporated by reference, discloses a marking device for persons which can be attached, for example, to the person's clothing and which indicates the person's position by means of an invisible radiation signal or other signals (acoustic, optical). The marking device also senses data itself from its surroundings and can therefore alert the person to possible dangers. In order to supply power, this marking device can have means for converting movement energy and thermal energy into electrical power.

The disadvantage of contemporary transponders which are attached to persons is in particular the fact that these transponders are permanently switched on and therefore continuously consume electrical power. As a result, transponder systems which are operated by means of batteries regularly either require a change of battery or have to be completely replaced, which in turn entails increased costs. Transponder systems which have their own means for generating electrical power are an alternative to this. However, electrical power cannot be generated in every situation. For example, a generator which operates on the basis of temperature differences can, for example, generate electrical power only when a sufficiently large temperature gradient is also present. In addition it appears questionable whether the power required by these systems can actually be made available by such a generator. Passive transponder systems which are known per se and which convert the electromagnetic radiation emitted by a transmitter partially into electrical power for their own operation and then in turn irradiate back a portion of this electrical power as a radio wave are a further alternative. Although such systems are independent of batteries and microgenerators, their transmission power is so low that the transmitted signal typically only has a range of a few centimeters. This is generally not sufficient for safety applications in road traffic.

SUMMARY OF THE INVENTION

An aspect of the present invention is a road safety communication device with a transponder with sufficient transmission field strength and at the same time an efficient energy balance for increasing the road safety of pedestrians in road traffic.

This is achieved according to an aspect of the invention by means of the road safety communication device for protecting pedestrians in road traffic, comprising a transponder which is integrated into a shoe, wherein the supply of electrical power to the device is activated only in predetermined situations, the safety risk analysis device for use in a motor vehicle for protecting pedestrians in road traffic, which communicates with a transponder, wherein the safety risk analysis device of the road safety communication device transmits a signal for activating the supply of electrical power to the road safety communication device, the method which is carried out in a device for protecting pedestrians in road traffic wherein the walking pace of the pedestrian is determined on the basis of the frequency of periodically occurring shoe deformations and the road safety communication system comprising a device for protecting pedestrians in road traffic and a risk analysis device for protecting pedestrians in road traffic which communicates with a transponder wherein the risk analysis device transmits a signal for activating the supply of electrical power to the road safety communication device and a method wherein the walking pace of the pedestrian is determined on the basis of the frequency of periodically occurring shoe deformations.

The road safety communication device according to an aspect of the invention for protecting pedestrians in road traffic, which comprises a transponder which is integrated into a shoe is distinguished by the fact that the supply of electrical power to the device is activated only in selected situations. As a result, the energy requirement of the device can be very greatly reduced compared to the devices of this type which are known per se in the prior art since the system is activated only when a selected situation is present. In all other situations, no energy is consumed. This gives rise to a more efficient energy balance of the transponder.

There is preferably provision that the supply of electrical power to the road safety communication device is activated by a radio signal or an acceleration switch. In the former case, the radio signal is emitted by a safety risk analysis device in a motor vehicle. If the road safety communication device is in the reception range of the signal, it is activated and can then, as an active safety system, reduce the risk of an accident for the pedestrian. This gives rise to the advantage that the device is activated only in those situations in which a vehicle is located in the vicinity of the device, that is to say only in potentially hazardous situations. In so far as the supply of electrical power to the road safety communication device is activated by an acceleration switch, the advantage arises that the device is automatically active as soon as the pedestrian moves and can therefore in principle find himself in a hazardous situation in road traffic. As a result of the movement of the device which is integrated into the pedestrian's shoe, the acceleration switch activates the supply of electrical power. As long as the shoes are not moved, it is possible to assume that they are not being worn. In this case, the device is deactivated and does not consume any energy. These properties also permit the use of conventional batteries whose energy store would otherwise be consumed within a short time and which would require the transponder to be replaced or at least make a change of battery or a complicated charging process of the batteries necessary.

In one advantageous embodiment of the invention there is provision that the road safety communication device comprises a microcontroller for processing data and an electronic memory for storing data. The memory can contain both static data, such as the shoe size and the type of the shoe, as well as data which is subject to regular changes, such as the walking pace. The walking pace can be determined by the microcontroller, for example from the signals of a suitable measuring device. Furthermore, the microcontroller processes the radio signals of the safety risk analysis device of a motor vehicle and selects from the electronic memory those data items which are to be transmitted.

In a further preferred embodiment, there is provision that the device is supplied with electrical power via a microgenerator. As a result, the system is independent of batteries whose limited service life would regularly require the road safety communication device to be replaced or at least make a change of battery necessary. The change of battery would entail constant costs for the customer and would also require spatial access to the device, which access would also constitute a weak point with respect to the penetration of water and dirt. In the case of rechargeable batteries, the need for a complex charging process is therefore advantageously eliminated.

In particular it is preferred that the microgenerator transforms the energy of the dynamic deformation or movement of the shoe into electrical power. This provides the advantage that the energy which is generated is available in precisely the situations in which it is required.

It is also particularly preferred that the road safety communication device comprises an energy accumulator for storing electrical power. The energy which is generated by the microgenerator can therefore be stored at least over a specific time period and is also available to the device in situations in which the microgenerator does not generate any electrical power. It is equally possible to charge the energy accumulator over a certain time period while the device is deactivated, with the result that sufficient electrical power is always available in an active phase.

It is also quite particularly preferred that the device is supplied with power via one or more batteries. In combination with activation of the road safety communication device by means of a radio signal or an acceleration switch, a longer service life of the battery is therefore provided. A combined supply of power by means of a microgenerator and one or more batteries is also possible. This provides the additional advantage that the battery is used as a power source only in situations in which the device is activated and the generator is at the same time not producing any electrical power. Its service life is therefore further increased.

There is expediently provision that the road safety communication device comprises a sensor for detecting dynamic shoe deformations. Such a sensor can detect whether or not the pedestrian is moving. Furthermore, said sensor can determine the stepping frequency and can at least estimate the pedestrian's mass by means of the amplitude of the deformation of the shoe. This information permits conclusions to be drawn about the dynamic behavior of the pedestrian and can be made available to the safety risk analysis device of a motor vehicle for detailed production of a hazard scenario.

Furthermore it is advantageous that when a dynamic deformation of the shoe is detected the road safety communication device is activated and, in particular, transmits a signal. This results, on the one hand, in a similar advantage to that arising from the use of an acceleration switch since the device is consequently activated and consumes energy only in situations in which the shoe is subjected to a dynamic deformation and the pedestrian is therefore participating in road traffic. A further advantage is obtained by virtue of the automatic transmission of a signal when a dynamic deformation of the shoe is detected. A motor vehicle's safety risk analysis device which is in transmission range, as is described further below, can determine the stepping frequency of the pedestrian on the basis of the transmission frequency of the signal and therefore the frequency of the dynamic deformation of the shoe. As a result, the evaluation of the sensor data is performed only in the safety risk analysis device, which permits a more simple design of the road safety communication device. This data permits the safety risk analysis device to draw conclusions about the movement speed and type of movement (walking, running, sprinting) of the pedestrian and therefore contributes to detailed production of a hazard potential in a safety risk analysis device.

Further it is advantageous that when activation occurs the road safety communication device transmits a random identification number for the purpose of differentiation from other road safety communication devices. As a result, in a safety risk analysis device of a motor vehicle it is possible not only to differentiate a plurality of pedestrians but also to permanently assign the received signals and therefore an individual behavior to a pedestrian.

According to a further preferred embodiment of the invention there is provision that the road safety communication device transmits data only when it previously receives an external trigger signal. This trigger signal can be transmitted, for example, by a safety risk analysis device of a motor vehicle. In particular in combination with an acceleration switch or in combination with a sensor for dynamic deformation of the shoe this provides the advantage that the system only has comparatively low power consumption even in the phases in which it is activated because transmission does not take place continuously.

In particular it is preferred that the road safety communication device transmits only those data items which are interrogated by the trigger signal. As a result, all the required information and all the necessary and available information can be made available to the calling external device without at the same time transmitting an unnecessarily large quantity of data.

In addition, the power consumption of the device is reduced.

Furthermore it is advantageous that the shoe size and/or the type of the shoe are stored in the electronic memory. The safety risk analysis device of a motor vehicle can draw conclusions about the expected behavior of the pedestrian on the basis of the transmitted shoe size. For example, a very small shoe size gives reason to suppose that the pedestrian in question is a child who usually behaves in a careless and unpredictable way in road traffic and may therefore require increased attentiveness on the part of the driver. A small shoe size can therefore be a trigger for a relatively high hazard stage in the created hazard scenario. Likewise, the type of the shoe makes it possible to draw conclusions about the behavior of a pedestrian. A sport shoe or running shoe suggests, for example, that its wearer moves quickly and dynamically. On the other hand, there is generally no risk of sudden and unexpected reactions from a pedestrian wearing ladies' shoes with high heels.

Furthermore it is preferred that the road safety communication device additionally transmits optical and/or acoustic signals. For example light emitting diodes which directly attract the driver's attention without the optical signals having to be firstly processed by the safety risk analysis device of a motor vehicle are suitable for transmitting the optical signals. This provides the advantage that the driver can better perceive the pedestrian, in particular in the dark and in poor visibility conditions. Likewise, the acoustic signals are suitable for increasing the driver's attention in respect of the pedestrian. Particularly in situations in which the pedestrian is, for example, partially concealed and cannot be seen by the driver, or can only be seen with difficulty, acoustic signals constitute an advantage.

The road safety communication device according to the invention is preferably distinguished by the fact that the device additionally comprises a conventional avalanche beacon. This provides the advantage that even pedestrians who have accidents other than road traffic accidents can be more easily located, for example by search and rescue personnel. By coupling the avalanche beacon to the traffic safety communication device it is possible for said avalanche beacon to have the same advantageous features as the device in terms of its energy balance.

In a further preferred embodiment of the invention there is provision that the traffic safety communication device can be removed from the shoe. The advantage of this feature is that the device can therefore also be flexibly integrated into other shoes or other items of clothing. Likewise, the device can be used in a handbag, a rucksack or even a wallet.

An aspect of the invention also relates to a safety risk analysis device in a motor vehicle for protecting pedestrians in road traffic, which communicates with a transponder, which is distinguished by the fact that the safety risk analysis device of the road safety communication device transmits a signal for activating the supply of electrical power to the road safety communication device. As a result, the traffic safety communication device is activated only in situations in which a vehicle is in the transmission range of the pedestrian. At the same time, the power consumption of the traffic safety communication device is greatly reduced since it is deactivated outside these selected situations.

The safety risk analysis device according to the invention is preferably distinguished by the fact that the safety risk analysis device transmits to the transponder of the road safety communication unit a signal for requesting the transmission of data. As a result, the safety risk analysis device can selectively interrogate those data items which is requires to create a hazard scenario. For example it may be sufficient for data such as the shoe size and type of shoe to be interrogated only once by each road safety communication unit, while other data such as the walking pace are interrogated at regular intervals. As a result, the quantity of the data to be transmitted and therefore the power consumption of the road safety communication unit are reduced.

Furthermore it is preferred that the safety risk analysis device evaluates the data transmitted by the transponder and calculates a hazard scenario on the basis of the evaluation of the data transmitted by the transponder.

In particular it is advantageous that the safety risk analysis device displays the hazard potential to the driver of the motor vehicle. As a result, the driver's attention can be selectively directed to potentially hazardous situations and processes, which in turn reduces the number and severity of the traffic accidents with pedestrians.

Furthermore it is advantageous that the safety risk analysis device of the traffic safety communication device transmits a signal for triggering optical and/or acoustic warning instructions. This permits the safety risk analysis device to trigger additional or alternative warning instructions for displaying the hazard potential. An optical signal can be perceived well by the driver particularly in the dark, while an acoustic signal can be perceived even when the pedestrian is entirely or partially concealed and can only be seen with difficulty by the driver.

It is particularly advantageous that the safety risk analysis device itself outputs an acoustic signal to the driver. Particularly modern vehicles are nowadays very well insulated against the effects of sound and noise with the result that a warning tone from outside the vehicle can be perceived in the interior only in a very muffled fashion. Furthermore, this measure helps to keep the power consumption of the traffic safety communication device as low as possible.

In a further preferred embodiment of the invention there is provision that the safety risk analysis device comprises a direction finding antenna for determining the position of the traffic safety communication device. This provides the advantage that the precise position of the pedestrian can be suitably displayed to the driver. This in turn brings about improved perception of the pedestrian by the driver and therefore less endangerment of the pedestrian. Furthermore, in this way data can be selectively interrogated by only those road safety communication devices which are located in a potentially hazardous region relative to the motor vehicle.

According to one particularly preferred embodiment of the invention there is provision that the safety risk analysis device transmits a position interrogation signal to the traffic safety communication device. The traffic safety communication device reacts to the reception of this signal with the transmission of a position response signal. By means of the direction finding antenna and corresponding signal processing, known per se, by the safety risk analysis device it is possible in this way for the direction of the traffic safety communication device with respect to the vehicle and the distance of said device from the vehicle to be determined regularly. This provides the advantage that the safety risk analysis device can determine the position of a pedestrian at any time.

An aspect of the invention also comprises a method which is carried out in a traffic safety communication device or a safety risk analysis device. The method according to the invention is distinguished by the fact that the walking pace of the pedestrian is determined on the basis of the frequency of periodically occurring shoe deformations. The walking pace permits conclusions to be drawn about the behavior and the speed of movement of the pedestrian and therefore permits the creation of a detailed hazard scenario by the safety risk analysis device.

The method is preferably distinguished by the fact that the pedestrian's mass is determined on the basis of the amplitude of the periodically occurring shoe deformations. Just as the walking pace permits conclusions to be drawn about the behavior and speed of movement of the pedestrian, the mass can also be an indicator for these parameters. A pedestrian with a mass of above average size will generally move more slowly and more carefully than a pedestrian whose mass corresponds to the average.

Furthermore, it is preferred that the distance of the traffic safety communication device is determined by means of the signal strength received by the safety risk analysis device.

The distance between the pedestrian and the motor vehicle is an important variable for the calculation of a hazard scenario. It decisively determines the level of the hazard.

According to a further preferred embodiment of the invention there is provision that the safety-relevant behavior of the pedestrian is estimated by the safety risk analysis device on the basis of the determined walking pace and/or the mass and/or the position of the pedestrian and/or the type and/or the size of the shoe. All these parameters are elementary variables for the creation of a hazard scenario which is close to real conditions. Combining as many of these parameters as possible permits a reliable statement to be made about the level of a current hazard potential.

Finally, an aspect of the present invention also relates to a road safety communication system which comprises the traffic safety communication device described above, the safety risk analysis device described above and the method which is described above and which is carried out in a traffic safety communication device and a safety risk analysis device.

The system is preferably distinguished by the fact that an ISM band (Industrial, Scientific and Medical Band) at 868 MHz is used as the transmission frequency. An ISM band constitutes a public frequency range. This provides the advantage that there is no special approval necessary for devices which transmit and/or receive in an ISM band.

Furthermore it is advantageous that the data are transmitted by means of a frequency-modulated, amplitude-modulated or phase-modulated transmission protocol.

BRIEF DESCRIPTION OF THE DRAWINGS

The invention is best understood from the following detailed description when read in connection with the accompanying drawing. Included in the drawing is the following figure.

DETAILED DESCRIPTION OF THE INVENTION

Figure 1:
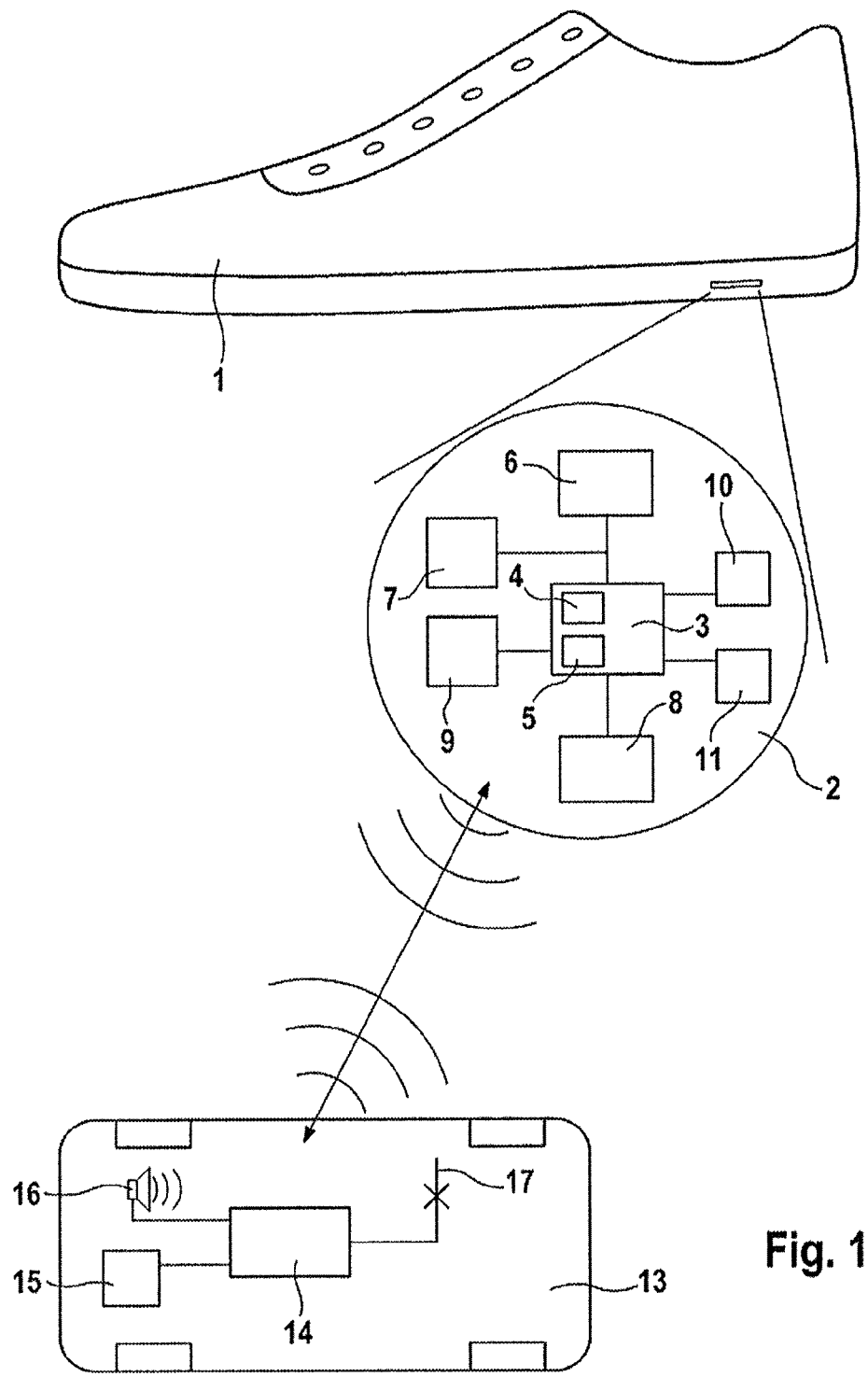
FIG. 1 is a schematic view of a traffic safety communication device which is integrated into a shoe and which interacts with a safety risk analysis device of a motor vehicle.

The traffic safety communication device 2 in FIG. 1 comprises the transponder 3 in which, in this exemplary embodiment, a microcontroller 4 and data memory 5 are integrated. In addition, the device 2 comprises a microgenerator 6 for supplying electrical power, an energy accumulator 7 for storing the electrical power generated by the microgenerator 6 and a sensor 8 for sensing dynamic shoe deformations. The traffic safety communication device 2 is completely integrated into the shoe 1. As soon as the motor vehicle 13 enters the pedestrian's vicinity, the transponder 3 in the traffic safety communication device 2 receives a radio signal from the safety risk analysis device 14 which activates the traffic safety communication device 2. Without this external radio signal, the traffic safety communication device 2 is deactivated and does not consume any energy. The energy accumulator 7 in this example may be of small and space-saving design since the road safety communication device 2 operates in an extremely energy-efficient fashion. The transmission range of the exemplary traffic safety communication device 2 is approximately 100 m in a free field and is therefore large enough to generate a warning or reaction by the safety risk analysis device 14 in good time. The transmission is carried out on a frequency-modulated basis on an ISM band at 868 MHz. Likewise, however, for example amplitude-modulated or phase-modulated data transmission is also possible.

If the motor vehicle 13 with the safety risk analysis device 14 which is integrated into the vehicle enters the transmission or reception range of the traffic safety communication device 2, the traffic safety communication device 2 is then activated. According to one exemplary embodiment, the traffic safety communication device 2 then signs on with the safety risk analysis device 14. The latter can then detect the direction from which the transponder signal is coming using, for example, a direction finding antenna 17 (for example cross dipole). If the signal is coming from the rear or from the side of the vehicle, there is generally no danger for the pedestrian and a further exchange of data between the traffic safety communication device 2 and the safety risk analysis device 14 is not necessary. An exception from this generalization may be, for example, the fact that the motor vehicle 13 is traveling in reverse. In this case, there is a potential hazard for pedestrians who are located behind the vehicle 13, and the safety risk analysis device 14 will correspondingly perform a further exchange of data with the traffic safety communication device 2 until there is no longer any further hazard. However, if the signal from the traffic safety communication device 2 comes from the front, the safety risk analysis device 14 determines in every case that in principle a hazard is present. It transmits a trigger signal to the traffic safety communication device 2 which in this example subsequently transmits all its available data to the safety risk analysis device 14 so that said data can be processed thereby and, if appropriate, a warning can be output to the driver. In a further exemplary embodiment it is possible for the safety risk analysis device 14 to interrogate only certain data from the traffic safety communication device 2. In this case, a correspondingly modified trigger signal would be transmitted. Instead of exclusively outputting a warning to the driver, it is, however, also conceivable for a vehicle-internal computer to make an intervention into the driving behavior on the basis of the data made available by the safety risk analysis device 14, in order, for example, to prevent a collision between the pedestrian and the motor vehicle 13. Since the relevant data are transmitted only in response to a specific trigger signal, the power consumption of the traffic safety communication device 2 is significantly reduced.

If the traffic safety communication device 2 has for example an extension-sensitive sensor 8 in order to detect shoe deformation 1 during running, the device then also has the information available as to whether the pedestrian is moving or is stationary. If the deformation occurs periodically with a specific frequency, the microcontroller 4 can determine the walking pace therefrom and detect, for example, how quickly the pedestrian is moving at that moment. This information is of interest particularly if when the safety risk analysis device 14 does not have a direction finding antenna. The increase or the decrease in the signal strength are also in principle suitable for making extrapolations about the pedestrian approaching or moving away. By means of the measured amplitude of the sensor 8 it is also possible for the microcontroller 4 to infer the pedestrian's mass. Further data such as, for example, the shoe size or whether the shoe is a sport shoe etc. can also be transmitted to the safety risk analysis device 14. This data permits the safety risk analysis device 14 to analyze the present situation with respect to its hazard potential and to calculate a hazard scenario which is close to real conditions. If the hazard potential which is detected is correspondingly large, warning measures or safety measures can also be initiated.

Instead of the use of a microgenerator for generating power for the traffic safety communication device 2, conventional batteries can also be used. In this exemplary embodiment it is possible to dispense with the microgenerator 6 and the energy accumulator 7. It is particularly advantageous in this context to implement the so-called "wake-up-on-radio" function, that is to say activation of the device in response to an external radio signal. As long as this radio signal is not received the traffic safety communication device 2 is deactivated and does not consume any energy. As a result, the service life of the battery can be prolonged very significantly. As an alternative to the specified "wake-up-on-radio" function it is also possible, for example, to use an acceleration switch which activates the supply of electrical power only as a result of the walking movement of the shoe. In this case, the traffic safety communication device 2 is activated only when the shoes are also actually used for walking, that is to say whenever the device is required. It has become apparent that it is efficient and therefore particularly advantageous to use an Li primary cell (for example CR2032) in conjunction with an acceleration switch. The chronologically unlimited functionality of the traffic safety communication device 2 is in any case not necessary in the vast majority of cases since generally after a certain time shoes are worn out and are replaced. In so far as the shoes are particularly long-lasting ones, according to a further exemplary embodiment it is possible to provide a charging function for the batteries, for example by means of induction. However, simply changing the battery may also be possible.

In so far as the safety risk analysis device 14 has a direction finding antenna (for example cross dipole antenna), the location of a pedestrian can be determined relatively precisely. However, in order also to be able to differentiate between a plurality of pedestrians and/or between the locations of a plurality of pedestrians, it is necessary for each traffic safety communication device to transmit a signal to the motor vehicle which can be at least easily differentiated. It is conceivable here, for example, to transmit to a random number or to use random modulation frequencies which arise on their own from the unintended series variation during manufacture.

In a further application example with the described "wake-up-on-radio" function, an RF microcontroller with an integrated radio interface is used. As a result, the expenditure on manufacture and the space requirement are kept small since an external radio interface is dispensed with. In particular, the relatively small space requirement is particularly advantageous when using the traffic safety communication device in a shoe. Suitable microcontrollers with a radio interface which have antenna diversity are commercially available today. As a result of the antenna diversity improved reception of the signals transmitted by the motor vehicle is made possible.

According to a further application example, the traffic safety communication device 2 is activated whenever dynamic deformation of the shoe is detected by the sensor 8 and the transponder 3 transmits a brief signal. This signal is received by the safety risk analysis device 14 which is as a result informed automatically about the presence of a pedestrian and the stepping frequency of said pedestrian. Further data is, however, not transmitted to the safety risk analysis device 14 until said device transmits a specific trigger signal in order to interrogate data from the traffic safety communication device 2.

In addition to the radio transmission from the traffic safety communication device 2 to the safety risk analysis device 14, it may, for example, be provided that the traffic safety communication device transmits optical signals in the visible spectrum. A suitable and particularly energy-efficient light source may be implemented, for example by means of an LED 10. As a result, not only does the safety risk analysis device 14 receive feedback from the traffic safety communication device 2, but the driver can also be alerted directly to the pedestrian. Quite particularly in the case of darkness it is therefore possible to reduce further the endangerment of the pedestrian. As an alternative to or in addition to the optical signals of the LED 10, acoustic warning signals can be generated by the acoustic warning device 11. The acoustic warning device 11 is also integrated into the traffic safety communication device 2. In a further exemplary embodiment it is possible for the acoustic warning signals not to be output by the acoustic warning device 11 but instead by the vehicle-internal acoustic warning unit 16 or vehicle-internal optical warning unit 15.

In a further exemplary embodiment, in addition to the transponder 3 an avalanche beacon 9 which is known per se is also integrated into the traffic safety communication device 2. This is helpful not only in the case of winter shoes but also quite generally whenever searching for persons who have had accidents other than road traffic accidents and whose precise location is unknown. A possible application example may be, for example, children playing in a wood. Since avalanche beacons must often penetrate several meters of snow or ice, a low transmission frequency with a relatively high transmission power is preferred. As a result, the power consumption is relatively high compared to the transponder 3. As a result of the coupling of the avalanche beacon to the exemplary traffic safety communication device with the described "wake-up-on-radio" function, the power consumption can, however, be reduced very greatly. Typical avalanche beacons operate at 457 kHz.

It is not absolutely necessary to use the traffic safety communication devices which are described by way of example only in a shoe. Instead, according to a further exemplary embodiment it is possible to remove the device from the shoes and integrate it, for example, into any other desired items of clothing. Particularly jackets and coats are conceivable here, but ultimately virtually any item of clothing and any bag are suitable.

According to a further exemplary embodiment, use in mobile terminals such as, for example, an MP3 player, a cell phone, a wristwatch etc. is also possible. In this case, the traffic safety communication device is, however, permanently integrated into the terminals.

Figure 2:
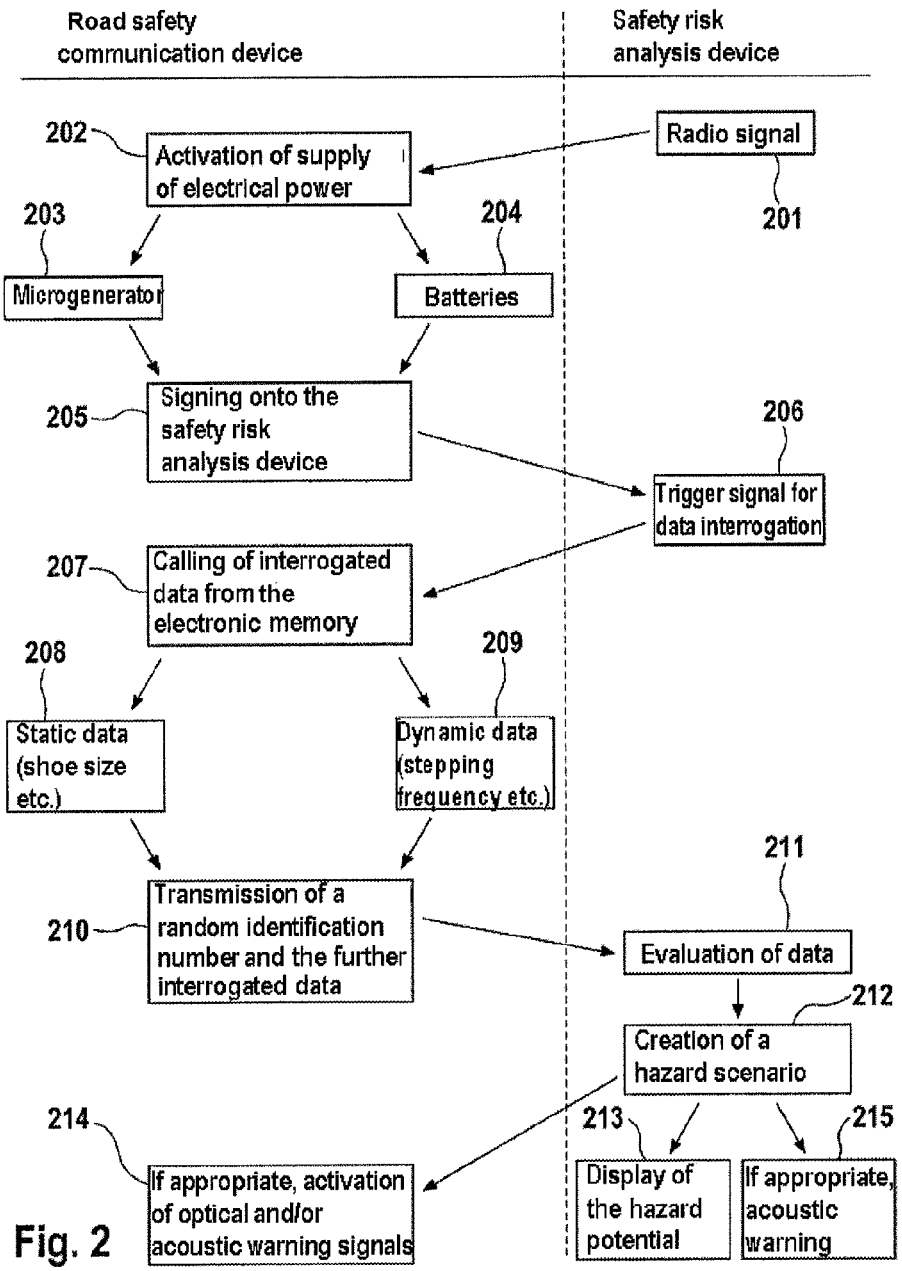
FIG. 2 shows a flowchart of the sequence scheme of the method according to the invention.

FIG. 2 shows the schematic sequence of the method according to the invention by means of an exemplary embodiment of the invention. As soon as a traffic safety communication device receives a corresponding radio signal 201 of a safety risk analysis device, the integrated "wake-up-on-radio" function activates the supply of electrical power at 202. The supply of power can take place, for example, via a microgenerator 203 or via batteries 204. The traffic safety communication device is then activated and signs on with the safety risk analysis device at 205 in order to inform the latter that a pedestrian is in the transmission range. The safety risk analysis device in turn then transmits a trigger signal 206 to the traffic safety communication device in order to interrogate certain data in order to create a hazard scenario at 207. This data can comprise, for example, the shoe size, the type of the shoe, the stepping frequency and a random identification number. The traffic safety communication device receives the trigger signal and calls the corresponding data from the electronic memory. Static data 208 such as, for example, the shoe size and the type of shoe is always present and can be called at any time. Dynamic data 209 such as, for example, the stepping frequency must, if appropriate, firstly be determined by a microcontroller. The traffic safety communication device subsequently transmits the data 210 requested by the safety risk analysis device. The safety risk analysis device evaluates the data at 211 and creates a corresponding hazard scenario 212. It subsequently displays the hazard potential to the driver in a suitable way at 213. Depending on the situation and level of the current hazard potential, optical and, if appropriate, additionally acoustic warning signals can be triggered at the traffic safety communication device 214, and the safety risk analysis device can also output an acoustic warning signal to the driver 215. The acoustic warning signals of the traffic safety communication device can, for example, be output as car-horn-like or siren-like wailing sounds, while the safety risk analysis device additionally or alternatively can also output a specific warning by means of a computer voice.

Figure 3:
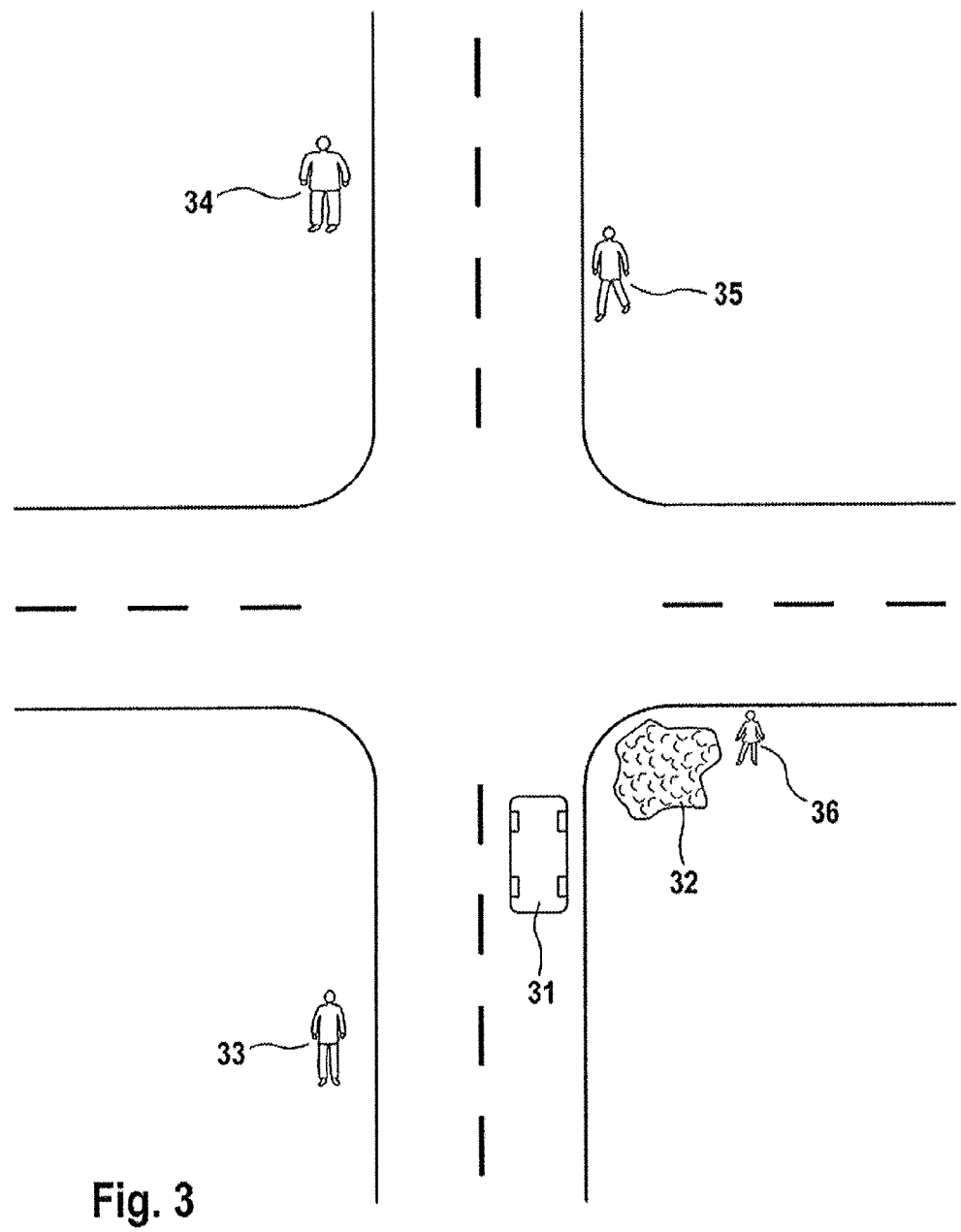
FIG. 3 is a schematic view of a traffic situation in which the road safety communication system according to the invention is used.

FIG. 3 is a schematic view of a traffic situation in which the traffic safety communication system according to the invention is particularly advantageously used. The motor vehicle 31 approaches an intersection with partially poor visibility because the driver's field of vision is restricted on the right-hand side by bushes 32. The safety risk analysis device which is integrated into the motor vehicle 31 is in radio contact with pedestrians 33, 34, 35 and 36. By determining the position of the pedestrian 33 by means of a direction finding antenna, the safety risk analysis device detects that the pedestrian 33 is in the region to the rear of the vehicle and is therefore located outside the potential hazardous area. The safety risk analysis device therefore does not interrogate any further data on the pedestrian 33. However, the determination of the position of the pedestrians 34, 35 and 36 reveals that they are located in front of the vehicle and are therefore in a potentially hazardous area. The safety risk analysis device therefore interrogates further data on these three pedestrians in order to calculate a hazard scenario which is close to real conditions. The transmitted data on the pedestrian 34 reveal that the pedestrian has a mass of above average size and a low stepping frequency. The safety risk analysis device consequently assumes that the pedestrian 34 is only moving slowly and therefore is not expected to suddenly move from the sidewalk to the roadway. The hazard potential for the pedestrian 34 is correspondingly categorized as low. In contrast, the data on the pedestrian 35 reveal that the pedestrian is an adult who is wearing jogging shoes and has a high stepping frequency. Consequently, a rapid and dynamic movement style must be expected. Correspondingly, the safety risk analysis device assumes that the pedestrian 34 could attempt to cross the roadway unexpectedly in front of the vehicle 31. The hazard potential is categorized as medium in this case. Since the pedestrian 36 is concealed by the bushes 32, he cannot be seen by the driver of the vehicle 31. The interrogated data also reveal that the pedestrian 36 is wearing children's shoes and has a high stepping frequency. Unexpected and careless behavior by the pedestrian is to be expected. Correspondingly, the hazard potential for the pedestrian 36 is categorized as very high. The safety risk analysis device therefore outputs an acoustic warning to the driver and activates the optical signal generators of the traffic safety communication device in the shoes of the pedestrian 36 in order to attract the driver's attention to the danger.

The invention claimed is:

1. A road safety communication device for protecting pedestrians in road traffic, comprising:
a transponder integrated into a shoe, and
a sensor integrated into the shoe,
wherein:
a supply of electrical power to the road safety communication device is activated and the transponder transmits a signal in response to the transponder receiving an external trigger signal, and
the supply of electrical power to the road safety communication device is de-activated in response to the transponder not receiving the external trigger signal.

2. The road safety communication device as claimed in claim 1, wherein the supply of electrical power to the road safety communication device is activated by a radio signal or an acceleration switch.

3. The road safety communication device as claimed in claim 1, wherein the road safety communication device comprises a microcontroller for processing data and an electronic memory for storing data.

4. The road safety communication device as claimed in claim 1, wherein the road safety communication device comprises a sensor for detecting dynamic shoe deformations.

5. The road safety communication device as claimed in claim 4, wherein when a dynamic deformation of the shoe is detected the road safety communication device is activated and transmits a signal.

6. The road safety communication device as claimed in claim 1, wherein when activation occurs the road safety communication device transmits a random identification number for the purpose of differentiation from other road safety communication devices.

7. The road safety communication device as claimed in claim 1, wherein the road safety communication device transmits data only when the road safety communication device previously receives an external trigger signal.

8. The road safety communication device as claimed in claim 1, wherein the road safety communication device additionally transmits at least one of optical and acoustic signals, and the road safety communication device additionally comprises an avalanche beacon.

9. A safety risk analysis device for use in a motor vehicle for protecting pedestrians in road traffic, which communicates with a transponder,
wherein the safety risk analysis device transmits a signal for activating a supply of electrical power to a road safety communication device that includes a transponder and a sensor integrated into a shoe, and
wherein the transponder transmits a signal in response to the transponder receiving the activation signal, and the supply of electrical power to the road safety communication device is de-activated in response to the transponder not receiving the activation signal.

10. The safety risk analysis device as claimed in claim 9, wherein the safety risk analysis device transmits to the transponder of the road safety communication device a signal for requesting the transmission of data.

11. The safety risk analysis device as claimed in claim 9, wherein the safety risk analysis device evaluates the data transmitted by the road safety communication device and calculates a hazard scenario on the basis of the evaluation of the transmitted data.

12. The safety risk analysis device as claimed in claim 9, wherein the safety risk analysis device comprises a direction finding antenna for determining a position of the road safety communication device.

13. A method which is carried out in a road safety communication device for protecting pedestrians in road traffic, comprising a sensor and a transponder integrated into a shoe, the method including:
- activating a supply of electrical power to the road safety communication device and transmitting a signal by the transponder in response to the transponder receiving an external trigger signal, and
- de-activating the supply of electrical power to the road safety communication device in response to the transponder not receiving the external trigger signal,
- wherein a walking pace of the pedestrian is determined on the basis of a frequency of periodically occurring shoe deformations.

14. The method as claimed in claim 13, wherein the pedestrian's mass is determined on the basis of an amplitude of the periodically occurring shoe deformations.

15. The method as claimed in claim 13, wherein a safety risk analysis device for use in a motor vehicle for protecting pedestrians in road traffic transmits the external trigger signal for activating the supply of electrical power to the road safety communication device,
- wherein safety-relevant behavior of the pedestrian is estimated by the safety risk analysis device on the basis of at least one of a determined walking pace of the pedestrian, a mass of the pedestrian, a position of the pedestrian, a type show worn by the pedestrian, a size of the shoe worn by the pedestrian.

16. A road safety communication system comprising:
- a road safety communication device for protecting pedestrians in road traffic, comprising a sensor and a transponder which is integrated into a shoe, wherein a supply of electrical power to the road safety communication device is activated and the transponder transmits a signal in response to the transponder receiving an external trigger signal, and the supply of electrical power to the road safety communication device is de-activated in response to the transponder not receiving the external trigger signal; and
- a safety risk analysis device for use in a motor vehicle for protecting pedestrians in road traffic, which communicates with the transponder,
- wherein the safety risk analysis device transmits the external signal for activating the supply of electrical power to the road safety communication device, and
- wherein the road safety communication system determines a walking pace of the pedestrian on the basis of a frequency of periodically occurring shoe deformations.

17. The system as claimed in claim 16, wherein an ISM band at 868 MHz is used as a transmission frequency.

\* \* \* \* \*